United States Patent Office 3,296,273
Patented Jan. 3, 1967

3,296,273
PROCESS FOR THE REMOVAL OF TERPYRIDYL IMPURITIES FROM BIPYRIDYLS
Frank Raymond Bradbury and James Adrian Jarvis, Widnes, England, assignors to Imperial Chemical Industries Limited, London, England, a corporation of Great Britain
No Drawing. Filed Feb. 6, 1964, Ser. No. 343,126
Claims priority, application Great Britain, Feb. 13, 1963, 5,900/63
13 Claims. (Cl. 260—296)

This invention relates to a purification process, and more particularly to a process for the removal of terpyridyl impurities (especially 2:2′,6′:2″-terpyridyl) from bipyridyls.

The methods available for the production of bipyridyls, particularly from pyridine, usually give rise to mixtures of isomers. In addition, such mixtures often contain tarry and polymeric by-products and higher polypyridyls, of which 2:2′,6′:2-terpyridyl is especially troublesome on account of its high toxicity. Consequently, it is highly desirable that efficient methods should be available for freeing bipyridyls from this terpyridyl.

Separation of bipyridyls and terpyridyls can be achieved by distillation but this is not a convenient or satisfactory method because they are high-boiling materials. Distillation is particularly inconvenient when the bipyridyls are produced by a process which provides them in aqueous solution. Also, in view of the small proportions of terpyridyl concerned, methods based on crystallisation or solubilities are not sufficiently effective for commercial use.

We have now found that the desired purification can be achieved by solvent extraction of the bipyridyls from an aqueous acid medium in the presence of a metal salt which can form a complex derivative with the terpyridyl, especially ferrous iron, the terpyridyl thus being held in the aqueous phase. This has the advantage, not only of enabling the toxic terpyridyl to be removed from the bipyridyl, but also of eliminating toxic material in an aqueous stage rather than accumulating a very dangerous residue in a still boiler. We also find the added advantage that the toxicity of the terpyridyl itself is reduced by conversion to iron complex.

Thus according to our invention we provide a process for the removal of terpyridyl impurity from a bipyridyl which comprises contacting the impure bipyridyl with a substantially water-immiscible organic solvent and an aqueous acid medium containing a metal derivative capable of forming a complex derivative with the terpyridyl content thereof and thereafter separating the organic solvent phase, which contains the bipyridyl.

Suitable metal derivatives are those derived from transition metals, or metals of groups 1B, 2B, 4A, 5A, 6A, 7A and 8 of the Periodic Classification, for example nickel, cobalt, zinc or iron. We prefer to use ferrous iron.

The process is especially applicable to the purification of 4:4′-bipyridyl. Mixtures of crude bipyridyls in which the 4:4′-isomer predominates and which are especially well suited to treatment by our process are those made from a magnesium-pyridine interaction product (for example by oxidation) as the bipyridyls made by this route usually contain significant amounts of terpyridyl.

The substantially water-immiscible organic solvent may be any organic solvent in which the bipyridyls are soluble, and may be in particular a hydrocarbon for example toluene or benzene, or a chlorinated hydrocarbon for example trichloroethylene or perchloroethylene. Mixtures of solvents may be used if desired.

The aqueous acid medium preferably has a pH in the range 5 to 6, as recovery of the purified bipyridyl is best within this range. Lower pH may be used if desired, but retention of bipyridyls in the aqueous phase can then become excessive. Higher pH tends to cause formation of precipitates, for example of ferric hydroxide, which can interfere with the separation of the aqueous and organic phases. Suitable acids include mineral acids, for example hydrochloric and sulphuric acids. It is usually most convenient, and more efficient, to dissolve the impure biypridyl in the acid medium before contacting with the organic solvent. As the aqueous phase tends to become increasingly acid when bipyridyls are extracted from it, it may be necessary to take steps to maintain the aqueous phase at the selected pH or at least to reduce deviation from it. This may be done by use of buffers for example acetate or formate buffers, or by adding alkali gradually during the extraction procedure.

The metal derivative may be provided in the form of a salt, most conveniently as a water-soluble salt. In the case of ferrous iron, there may be used for example ferrous sulphate, ferrous ammonium sulphate or ferrous chloride. Corresponding salts of other metals may be used. The proportion required is dependent to some extent upon the composition of the particular bipyridyl to be purified, and especially upon the proportion of terpyridyl present in this. In general, a proportion providing a concentration of 0.02% to 1% by weight of the metal, for example of ferrous iron, in the aqueous acid medium is sufficient, though more concentrated solutions may be used if desired. This corresponds to a concentration of 0.1% to 5% by weight of ferrous sulphate heptahydrate. The proportion of complex-forming metal should be sufficient to provide a substantial excess over that theoretically required for complex formation with the terpyridyl, so as to allow for the presence of other materials which may be competing for complex formation with the metal. A proportion of metal derivative equivalent to between 2 and 5 times that required theoretically is most suitable.

In order to assist retention of the terpyridyl in the aqueous acid phase and extraction of the bipyridyls into the organic solvent phase, it is usually advantageous to carry out the contacting stage of our process at elevated temperature and preferably at a temperature not less than 60° C. The time required for the contacting stage and the temperature to be employed are to some extent dependent upon each other, and equilibrium is reached more rapidly at higher temperatures.

Preferably, a solution of crude bipyridyl in aqueous acid (for example dilute hydrochloric or sulphuric acid) is treated with the appropriate amount of metal derivative, for example ferrous salt, and then contacted with the organic solvent. The solution of crude bipyridyls may be for example one obtained by dissolving in acid the reaction mixture in which the bipyridyl was produced, and may contain various impurities and inorganic salts, for example sodium or magnesium salts. To assist conversion of the terpyridyl into a form in which it is most readily retained in the aqueous phase, it is preferred to digest the aqueous acid mixture containing the crude bipyridyls and the metal derivative (for example ferrous salt) at elevated temperature for example at 60 to 90° C. for 1 to 3 hours before extraction with organic solvent. After this treatment, the pH of the solution can be adjusted if necessary to bring it to the selected value for the extraction of the bipyridyls, and maintained in the desired range for the extraction step.

To check whether the appropriate proportion of metal derivative (for example ferrous salt) has been added or the appropriate digestion has been carried out for our process to be mose efficient, a convenient test comprises making a paper chromatogram of a sample of the aqueous acid phase and applying a solution of ferrous sulphate to the colourless section of it. If a further red colour is produced, indicating the presence of free 2:2′,6′:2″-terpyridyl, further heating or more of the metal derivative (for example ferrous salt) is required.

The process may be carried out by contacting the aqueous acid medium and the organic solvent phases sufficiently thoroughly to give a distribution of bipyridyls and terpyridyls between the phases which is economically near to equilibrium. This is most conveniently done in a continuous extraction column, but can also be carried out in a series of stepwise extractions and separations if desired. The proportions of the two liquid phases and of the bipyridyls may be adjusted so as to be appropriate to the technique used. Agitation or other means for promoting intimate contact of the two liquid phases may be used. Surface active agents may be added, if desired, to facilitate separation of the two liquid phases and to minimise deposition of solids or tars in the apparatus. Aqueous mixtures containing appreciable proportions of 4:4′-bipyridyl are preferably kept above 60° C. to minimise formation of 4:4′-bipyridyl hydrate, at least until after removal of the aqueous acid phase.

Separation of the organic solvent phase may be effected in any convenient manner, for example by centrifugal separator, by settling and decantation, or the like. Purified bipyridyl may be recovered from the organic solvent phase by conventional means, for example by distillation, extraction with acid followed by treatment of the acid extract with alkali, by crystallisation, or by combinations of such techniques. 4:4′-bipyridyl can also be recovered as the hydrate by treatment of the solution of bipyridyls in the organic solvent, with water at a temperature below 60° C. Although the bipyridyl may be converted into other products, for example into quaternary bis-pyridylium salts which are useful herbicidal materials, by treatment with appropriate reagents but without intermediate isolation.

The invention is illustrated but not limited by the following examples in which the parts and percentages are by weight.

*Example 1*

90 parts of an aqueous acid solution of the crude bipyridyls obtained by oxidation of a magnesium-pyridine interaction product, containing approximately 10% of 4:4′-bipyridyl and having a 2:2′,6′:2″-terpyridyl content of approximately 0.16% was treated with 1.2 parts of ferrous sulphate heptahydrate and the mixture was heated at 70° C. for 1½ hours. The resulting mixture was then buffered to pH 5.3 by addition of sodium formate and formic acid, and extracted with 127 parts of trichloroethylene for 3 hours at 60° C. in a continuous extraction apparatus in which the trichloroethylene is contacted with the aqueous solution, separated, distilled, condensed and recycled. The extraction apparatus was lagged to help to keep the temperature constant during extraction. The resulting trichloroethylene extract was found to contain 4:4′-bipyridyl substantially free from 2:2′,6′:2″-terpyridyl. The theoretical recovery of 4:4′-bipyridyl was achieved by distillation of the trichloroethylene from the solvent extract.

*Example 2*

370 parts of an aqueous acid solution of the crude bipyridyls obtained by oxidation of a magnesium-pyridine interaction product containing approximately 10% of 4:4′-bipyridyl and approximately 0.15% of 2:2′,6′:2″-terpyridyl at pH 5.5 was treated with 5 parts of ferrous sulphate heptahydrate and the mixture was heated at 70° C. for 1¼ hours. The resulting mixture was then extracted with 224 parts of trichloroethylene at 60° C. in a continuous extraction apparatus. After 2 hours the aqueous phase was adjusted to a pH of 5.7 by the addition of caustic soda and the extraction procedure was continued for a further 3 hours, after which time the aqueous phase had a pH of 5.5. The resulting trichloroethylene extract was found to contain 4:4′-bipyridyl substantially free from 2:2′,6′:2″-terpyridyl. Theoretical recovery of 4:4′-bipyridyl was achieved by distillation of the trichloroethylene from the solvent extract.

What we claim is:

1. Process for the removal of terpyridyl impurity from a bipyridyl which comprises contacting the impure bipyridyl with a substantially water-immiscible organic solvent and an aqueous acid medium containing a metal derivative capable of forming a complex derivative with the terpyridyl content thereof, said metal derivative being a derivative of a metal selected from the class consisting of nickel, cobalt and iron, and said aqueous acid medium having a pH value of at most about 6, and thereafter separating the organic solvent phase which contains the bipyridyl.

2. Process as claimed in claim 1 wherein the bipyridyl treated is 4:4′-bipyridyl.

3. Process as claimed in claim 1 wherein the bipyridyl treated is derived from a magnesium-pyridine interaction product.

4. Process as claimed in claim 1 wherein there is used a derivative of ferrous iron.

5. Process as claimed in claim 4 wherein the aqueous acid medium is at a pH in the range 5 to 6.

6. Process as claimed in claim 1 wherein the bipyridyl is treated with the metal derivative at a temperature not less than 60° C.

7. Process as claimed in claim 1 wherein the bipyridyl and the metal derivative are digested together for 1 to 3 hours before extraction with organic solvent.

8. Process as claimed in claim 1 wherein the solvent is a hydrocarbon.

9. Process as claimed in claim 1 wherein the solvent is a chlorinated hydrocarbon.

10. Process as claimed in claim 9 wherein the solvent is trichloroethylene.

11. Process as claimed in claim 1 wherein the terpyridyl is 2:2′,6:2″-terpyridyl.

12. A process for the removal of terpyridyl impurity from 4:4′-bipyridyl obtained by oxidation of a magnesium-pyridine interaction product which comprises heating a solution of the impure bipyridyl in an aqueous acid medium containing a water-soluble ferrous salt and having a pH of 5 to 6 at a temperature above 60° C. for from 1 to 3 hours, then contacting the heated solution with a substantially water-immiscible chlorinated hydrocarbon whereby said 4:4′-bipyridyl is extracted by said solvent and said terpyridyl remains in said aqueous medium and thereafter separating the resulting organic solvent phase from said aqueous medium.

13. The process of claim 12 wherein said ferrous salt is ferrous sulphate, said acid medium containing from 0.02% to 1% by weight of iron.

No references cited.

WALTER A. MODANCE, *Primary Examiner.*

ROBERT T. BOND, *Assistant Examiner.*